United States Patent [19]

Mewburn-Crook et al.

[11] Patent Number: 4,857,753
[45] Date of Patent: Aug. 15, 1989

[54] WIND ENERGY CONVERTOR

[75] Inventors: Anthony J. S. Mewburn-Crook, Isleworth; Peter Bullen, London; Simon Read, Stonely, all of England

[73] Assignee: Mewburn-Crook Company Limited, Egham, United Kingdom

[21] Appl. No.: 116,456

[22] Filed: Nov. 3, 1987

[30] Foreign Application Priority Data

Oct. 4, 1986 [GB] United Kingdom ............... 8626347

[51] Int. Cl.$^4$ .............................................. F03D 9/00
[52] U.S. Cl. .................................... 290/55; 290/54; 290/43; 416/119; 415/907
[58] Field of Search .................... 290/1 R, 42, 43, 44, 290/52, 53, 54, 55; 416/41 R, 41 A, 117, 119, 132 B, 140; 415/2 R, 2 A, 3 R, 3 A, 4, 5; 60/495–508

[56] References Cited

U.S. PATENT DOCUMENTS

| | | |
|---|---|---|
| 268,292 | 11/1882 | Robinson . |
| 518,300 | 5/1894 | Winegarden . |
| 756,216 | 4/1904 | Crunican . |
| 918,364 | 4/1909 | Pope . |
| 1,128,636 | 2/1915 | Terzian . |
| 1,413,861 | 4/1922 | McDowell . |
| 1,463,924 | 8/1923 | Ozaki . |
| 1,519,447 | 12/1924 | Fortier-Beaulieu . |
| 2,144,719 | 1/1939 | Ceffcken . |
| 2,652,699 | 9/1953 | Romani . |
| 2,838,239 | 6/1958 | Dom . |
| 3,793,530 | 2/1974 | Carter . |
| 3,922,012 | 11/1975 | Herz .......................... 290/54 |
| 4,004,427 | 1/1977 | Butler . |
| 4,039,849 | 8/1977 | Mater et al. ................. 290/55 |
| 4,047,834 | 9/1977 | Magoveny et al. ........... 290/55 X |
| 4,048,947 | 9/1977 | Sicard ........................ 290/55 X |
| 4,095,422 | 6/1978 | Kurakake .................... 290/54 |
| 4,137,009 | 1/1979 | Telford . |
| 4,142,822 | 3/1979 | Herbert et al. .............. 290/55 X |
| 4,162,410 | 7/1979 | Amick ........................ 290/55 |
| 4,184,084 | 1/1980 | Crehore . |
| 4,203,707 | 5/1980 | Stepp . |
| 4,217,501 | 8/1980 | Allison . |
| 4,224,528 | 9/1980 | Argo . |
| 4,245,958 | 1/1981 | Ewers . |
| 4,247,252 | 1/1981 | Seki et al. ................... 416/119 X |
| 4,269,523 | 5/1981 | Kay . |
| 4,285,636 | 8/1981 | Kato et al. .................. 416/119 |
| 4,289,444 | 9/1981 | Monk et al. ................ 415/3 R |
| 4,311,434 | 1/1982 | Abe . |
| 4,342,539 | 8/1982 | Potter . |
| 4,414,477 | 11/1983 | Mewburn-Crook et al. . |
| 4,415,312 | 11/1983 | Brenneman ................ 416/119 |
| 4,452,046 | 6/1984 | Valentin . |
| 4,490,623 | 12/1984 | Goedecke .................. 416/119 X |
| 4,537,559 | 8/1985 | Herrmann .................. 416/119 |
| 4,566,854 | 1/1986 | Slezak ........................ 416/119 |

FOREIGN PATENT DOCUMENTS

| | | |
|---|---|---|
| 96382 | 4/1924 | Austria . |
| 0043872 | 1/1982 | European Pat. Off. . |
| 7358 | 5/1879 | Fed. Rep. of Germany . |
| 71758 | 11/1893 | Fed. Rep. of Germany . |

(List continued on next page.)

Primary Examiner—William M. Shoop, Jr.
Assistant Examiner—Paul Ip
Attorney, Agent, or Firm—Thomas R. Shaffer

[57] ABSTRACT

In a vertical axis wind generator incorporating a circular turbine supported by an uppermost part of an upstanding support, a stator surrounding and coaxial with the turbine comprises an upper annular body positioned adjacent and or above the upper end of the turbine and having an uppermost surface which over at least a part of its radial width is inclined downwardly towards the vertical axis, a lower annular body positioned adjacent and/or below the lower end of the turbine and, extending lengthwise between the annular bodies, a plurality of circumferentially spaced blades define the venturi. Preferably, the undersurface of the lower annular body over at least a part of its radial width is inclined upwardly towards the vertical axis. The wind energy convertor will convert into mechanical energy the energy of a wind blowing in any direction and is capable of self-starting, irrespective of the direction of the wind.

13 Claims, 3 Drawing Sheets

FOREIGN PATENT DOCUMENTS

| | | |
|---|---|---|
| 924838 | 3/1955 | Fed. Rep. of Germany . |
| 2507518 | 8/1976 | Fed. Rep. of Germany . |
| 2748971 | 8/1979 | Fed. Rep. of Germany . |
| 2812465 | 9/1979 | Fed. Rep. of Germany . |
| 2938239 | 3/1980 | Fed. Rep. of Germany . |
| 62973 | 4/1982 | Japan . |
| 137657 | 8/1982 | Japan . |
| 866265 | 9/1981 | U.S.S.R. . |
| 131958 | 9/1919 | United Kingdom . |
| 169733 | 8/1921 | United Kingdom . |
| 185939 | 9/1922 | United Kingdom . |
| 225475 | 12/1924 | United Kingdom . |
| 343399 | 2/1931 | United Kingdom . |
| 647924 | 12/1950 | United Kingdom . |
| 647929 | 12/1950 | United Kingdom . |
| 1599653 | 10/1981 | United Kingdom . |
| 2083564 | 3/1982 | United Kingdom . |
| 217453 | 10/1983 | United Kingdom . |

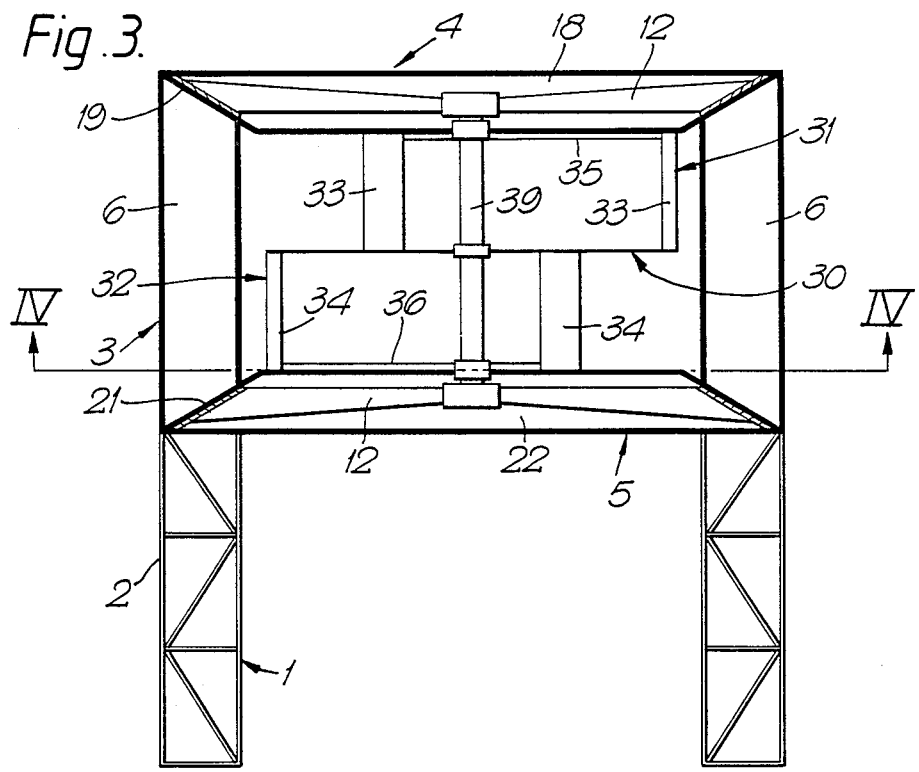
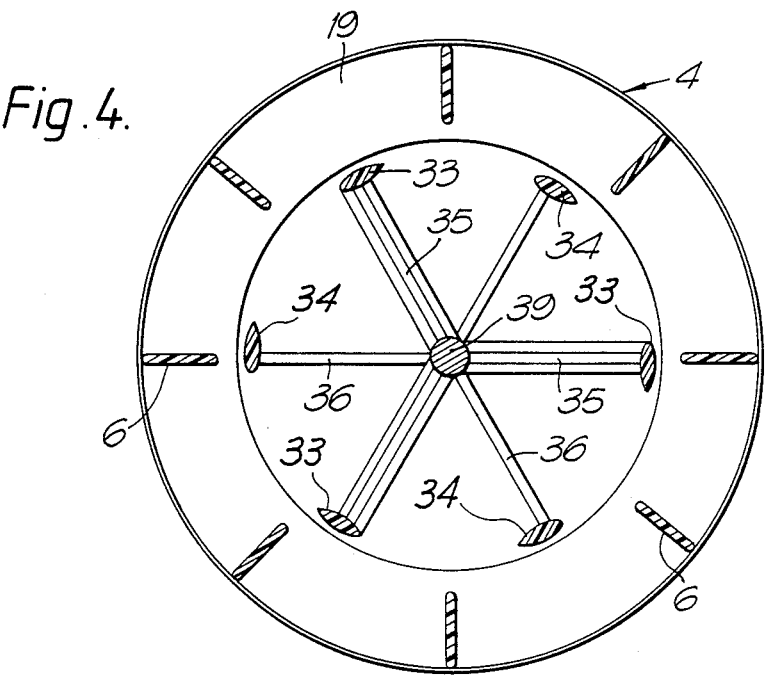

WIND ENERGY CONVERTOR

This invention relates to apparatus for converting the energy of the wind into mechanical energy for use in the generation of electricity or other source of power and, for convenience, such apparatus will hereinafter be referred to by the generic expression "wind energy convertor".

In the specification of U.K. Patent No: 2083564B, there is described and claimed a wind energy convertor comprising an upstanding column; a fan which is supported on the upper end of the column in such a way that the fan is freely rotatable about the axis of the column and which comprises a plurality of circumferentially spaced, radially extending blades; a substantially circular turbine which surrounds and is radially spaced from an uppermost part of, and is supported by and freely rotatable about the axis of, the column, and which comprises a plurality of circumferentially spaced blades extending lengthwise with respect to the column; and an annular body which is supported by the column and which is co-axial with and is positioned adjacent to the outer circumferential edge of the fan, the upper surface of the annular body being above the fan and being so shaped as to cause the velocity of wind that blows against this surface to increase as it passes over the surface, thereby creating a reduction in air pressure in the circular space bounded by the annular body so that wind blowing against the blades of the turbine and driving the turbine rotatably about the axis of the column is drawn upwardly within the turbine to drive the fan rotatably about the axis of the column in the same rotational direction as the turbine, thereby converting the energy of the wind into rotational mechanical energy.

In a preferred embodiment of the wind energy convertor described and claimed in the aforesaid patent, the angle of inclination of the upper surface of the annular body to the axis of the column increases smoothly in an upward direction and the wind energy convertor includes, radially outwardly of and surrounding the turbine, a stator constituted by the aforesaid annular body, a second annular body co-axial with and spaced below the aforesaid annular body and, extending lengthwise between the annular bodies, a plurality of circumferentially spaced blades which define, between adjacent blades, a plurality of venturi through which wind is directed on to the blades of the turbine.

Whilst the preferred embodiment of the wind energy convertor of the aforesaid patent is a high performance machine which will successfully convert into mechanical energy the energy of a wind blowing in any direction and which is capable of self-starting, irrespective of the direction of the wind, the wind energy convertor is relatively expensive because of the amount of material required in its construction and the time and labour involved in its manufacture.

It is an object of the present invention to provide an improved wind energy convertor which has substantially the same high performance and all the advantages of the wind energy convertor of the aforesaid patent but which can be manufactured at substantially less cost.

According to the invention, the improved wind energy convertor comprises an upstanding support having a central vertical axis; a substantially circular turbine which is directly or indirectly supported by an uppermost part of the support in such a way that the turbine is freely rotatable about said vertical axis and which comprises a plurality of circumferentially spaced blades extending lengthwise with respect to the support and, coaxial with and surrounding the turbine, a stator comprising an upper annular ring positioned adjacent and/or above the upper end of the turbine and having an uppermost surface which over at least a part of its radial width is inclined downwardly towards said central vertical axis, a lower annular body positioned adjacent and/or below the lower end of the turbine, and, extending lengthwise between the annular bodies, a plurality of circumferentially spaced blades which define, between adjacent blades, a plurality of venturi through which wind is directed on to the blades of the turbine, the arrangement being such that wind blowing against the outer peripheral edge of the upper annular ring will be deflected over the downwardly inclined uppermost surface of the upper annular ring to cause such turbulence in the wind that the air pressure in the central opening bounded by the upper annular body will be so decreased that wind blowing through the venturi and against the blades of the turbine and driving the turbine rotatably about said central vertical axis will be drawn upwardly within the turbine and out of the upper annular ring.

Preferably, the undersurface of the lower annular ring over at least a part of its radial width is inclined upwardly towards said central vertical axis of the upstanding support so that wind blowing against the outer peripheral edge of the lower annular ring will be deflected under the upwardly inclined lowermost surface of the lower annular body to cause such turbulence in the wind that the air pressure in the circular opening bounded by the lower annular ring will be decreased so that wind blowing through the venturi and against the blades of the turbine and driving the turbine rotatably about said central vertical axis will be drawn downwardly within the turbine and out of the lower annular ring.

The undersurface of the upper annular ring over at least a part of its radial width is preferably so inclined downwardly towards said central vertical axis as to direct wind, deflected by the outer peripheral edge of the upper annular ring through the venturi, towards the blades of the turbine, and the uppermost surface of the lower annular ring over at least a part of its radial width preferably is so inclined upwardly towards said central vertical axis as to direct wind, deflected by the outer peripheral edge of the lower annular ring through the venturi, towards the blades of the turbine.

The uppermost surface and undersurface of the upper annular ring are preferably inclined downwardly towards said central vertical axis over substantially the whole of their radial width. The angle of inclination of each surface to said central vertical axis may be substantially constant throughout its radial width or the angle of inclination of each surface may increase smoothly in a downward direction. The uppermost surface and undersurface of the lower annular ring are preferably inclined upwardly towards said central vertical axis over substantially the whole of their radial width. The angle of inclination of each surface of the lower annular ring to said central vertical axis may be substantially constant throughout its radial width or the angle of inclination of each surface may increase smoothly in an upward direction.

By virtue of the fact that the upper annular body of the stator can be in the form of an annular dish with substantially planar upper and lower surfaces or in the form of an annular saucer with a smoothly curved concave inner surface and a smoothly curved convex outer surface and the lower annular ring can be in the form of an inverted annular dish or an inverted annular saucer, each annular ring can be made of a single sheet of metal or metal alloy or of a suitable non-metallic material, thereby substantially reducing the cost of the machine as compared with the wind energy convertor of the aforesaid patent.

In view of the foregoing, the present invention provides an improved wind energy convertor of the type having an upstanding support having a central vertical axis, a substantially circular turbine rotatably supported by the support whereby said turbine is freely rotatable about said vertical axis, said turbine having an upper end and a lower end and having a plurality of circumferentially spaced blades extending lengthwise with respect to the support and, coaxial with and surrounding a vertical axis of the turbine, a stator having an upper annular ring having a central opening therein, said upper ring positioned adjacent and above the upper end of the turbine, a lower annular ring having a central opening therein, said lower ring positioned adjacent and below the lower end of the turbine, and a plurality of circumferentially spaced venturi blades extending lengthwise between the annular rings which define, between adjacent blades, a plurality of venturi through which wind is directed on to the blades of the turbine, wherein the improvement comprises said upper annular ring having an upwardly facing top frusto-conical surface and a downwardly facing bottom frusto-conical surface, each of said top and bottom surfaces of the upper annular ring inclining downwardly towards the central vertical axis over substantially the entire width of the upper annular ring from an outer peripheral edge to an inner circumferential edge thereof whereby wind blowing across and over the top of the outer peripheral edge of the upper annular body towards the central vertical axis is deflected over the downwardly inclined upwardly facing top frusto-conical surface of the upper annular body to cause such turbulence in the wind that the air pressure in the central opening by the upper annular body is decreased causing wind blowing through the venturi and against the blades of the turbine and driving the turbine rotatably about said central vertical axis to be drawn upwardly within the turbine and out of the upper annular ring through the central opening therein.

As an optional additional feature, the invention provides such a wind energy convertor having a downwardly facing bottom frusto-conical surface and an upwardly facing top frusto-conical surface of the lower annular ring, each of said bottom and top surfaces of the lower annular ring inclining upwardly towards the central vertical axis over substantially the entire width of the lower annular ring from an outer peripheral edge to an inner circumferential edge thereof whereby wind blowing across and under the bottom of the outer peripheral edge of the lower annular ring towards the central vertical axis is deflected under the upwardly inclined lowermost surface of the lower annular ring to cause such turbulence in the wind that the air pressure in the circular opening bounded by the lower annular body is decreased causing wind blowing through the venturi and against the blades of the turbine and driving the turbine rotatably about said central vertical axis to be drawn downwardly within the turbine and out of the lower annular ring through the central opening therein.

Preferably, the surfaces of the blades of the stator are so shaped as to shield from the wind the on-coming blades of the turbine, thereby substantially reducing drag on the turbine. The radially outer edges of the venturi blades may extend substantially vertically but, preferably, they are inclined radially, inwardly in a direction towards the upper annular ring.

At one or each of its upper and lower ends, the turbine may include a plurality of circumferentially spaced, radially extending blades constituting, in effect, a fan integral with the turbine.

The circular turbine of the improved wind energy convertor may have at least two groups of circumferentially spaced, lengthwise extending blades, each of which groups of lengthwise extending blades is spaced lengthwise with respect to the or each other group of blades and is rigidly secured to the or each adjacent group of blades, the circumferentially spaced blades of one group being circumferentially staggered with respect to the circumferentially spaced blades of the other group or of at least one of the other groups. Circumferential staggering of the lengthwise extending blades of adjacent groups of blades of the turbine provides beneficial dynamic characteristics. By arranging for the circumferentially spaced, lengthwise extending blades of each group to be fewer in number than a circular turbine having a single group of blades and by arranging for each blade of each group to be substantially shorter in length than the blades of a single group of blades of a circular turbine manufacture of the blades is simplified and the bending moment on and the cost of manufacture of the blades is substantially reduced as compared with a circular turbine having a single group of blades.

Preferably, each of at least some of the plurality of circumferentially spaced, lengthwise extending blades of the or each group of blades of the turbine is pivotally mounted about a substantially vertical axis passing through the blade and each has associated means for automatically restraining pivotal movement of said blade about its vertical axis, the arrangement being such that, as the velocity of wind directed on outwardly facing surfaces of the pivotable turbine blades gradually increases and hence the speed of rotation of the turbine gradually increases from zero to a predetermined value, the resultant gradually increasing centrifugal force on the pivotable turbine blades causes each pivotable turbine blade to pivot about its vertical axis against the action of its associated restraining means, the restraining means being of such a form that, as the velocity of the wind gradually increases until the rotational speed of the turbine reaches said predetermined value, each pivotable blade is permitted to pivot smoothly against incremental restraint from an initial position in which it lies at a positive acute angle to a tangent of the circle passing through the vertical rotational axes of the pivotable turbine blades to a normal running position in which it lies along or at a small angle to said tangent, and, as the velocity of the wind increases further to or above a maximum acceptable value, each pivotable blade is permitted to pivot smoothly from the said normal running position to a "feathering" position in which it lies at a negative acute angle to said tangent, thereby ensuring that, as the velocity of the wind reaches or exceeds said maximum acceptable value, the torque and the ratio of peripheral turbine speed to wind speed are reduced to maintain substantially constant power and to ensure that the rotational speed of the turbine is not increased to an undesirable extent.

The provision of pivotable turbine blades in the improved wind energy convertor has the important advantage that the improved wind energy convertor has a high starting torque and that, since each pivotable turbine blade is restrained from pivoting beyond the normal running position until the velocity of the wind reaches or exceeds a maximum acceptable value and, when the wind reaches or exceeds said maximum acceptable value each blade is permitted to pivot smoothly to a "feathering" position, the rotational speed of the turbine will never exceed a predetermined maximum safe value, irrespective of the velocity of the wind as the aerodynamic characteristics of the convertor automatically change. The improved wind energy convertor with pivotable turbine blades will, therefore, operate satisfactorily over a wide range of wind velocities, preferably as a variable speed device, but capable of operating as a constant speed device, if required.

Where the improved wind energy convertor is to be capable of operating as a constant speed device, each of at least some of the pivotable turbine blades of the or each group may have operatively coupled thereto means for positively adjusting the acute angle at which the blade lies to a tangent of the circle passing through the vertical rotational axes of the pivotable turbine blades.

The restraining means associated with each pivotable turbine blade may be a single restraining device which will permit controlled pivotable movement of the blade until the centrifugal force on the blade reaches a predetermined value and which will then resist further pivotable movement of the blade until the velocity of the blade reaches or exceeds said maximum acceptable value when the restraining device will permit further pivotable movement of the blade through the "feathering" position, but, for ease of manufacture, preferably the restraining means associated with each pivotable turbine blade comprises two restraining devices independent of one another, one restraining device permitting controlled pivotable movement of the blade from the start position to the normal full speed running position and the other restraining device resisting pivotable movement of the blade until the velocity of the wind reaches or exceeds said maximum acceptable value when the blade is permitted to pivot to the "feathering" position. Preferably, the first of said two restraining devices comprises a spring or springs connected to the pivotable turbine blade and the second of said two restraining devices is either a further spring or an elongate torsion member arranged along the vertical pivotal axis of the blade and fixed at one or both of its ends. The elongate torsion member may be a bar or tube of steel, of resin bonded carbon fibres or of other suitable composite materials. Alternatively, each of said two restraining devices may be an elongate torsion member, the first restraining device being a torsion tube and the second restraining device being a torsion bar surrounded by and coaxial with the torsion tube, the axes of the torsion tube and torsion bar lying along the vertical pivotal axis of the blade and the torsion tube and the torsion bar each being fixed at one or both of its ends.

Preferably, each turbine blade has a transverse cross-section of substantially aerofoil shape; preferably, also, the leading edge of each turbine blade is inclined radially outwardly in the direction of rotation of the turbine.

The upstanding support may be a single column as described in the specification of the aforesaid patent or, where the wind energy convertor is to be of a substantially larger construction than the wind energy convertor of the aforesaid patent, the support may comprise a plurality of upstanding elongate members uniformly spaced around said central vertical axis, the turbine being rotatably supported at at least one of its ends by said upstanding members. The plurality of upstanding elongate members may be the legs of a lattice work tower or pylon but, in a preferred embodiment, the plurality of upstanding elongate members are vertical columns on or with respect to which the stator is slidably or otherwise so mounted that it can be raised or lowered when required; the turbine is carried by and is freely rotatable with respect to the stator so that it is indirectly supported by the vertical columns; and the vertical columns have associated means for raising or lowering the stator, and the turbine carried thereby, with respect to the columns and for locking the stator with respect to the columns when it is in the desired position. The aforesaid preferred embodiment has the important advantage that the stator, and the turbine carried thereby, can be raised with respect to the columns to the desired position without the use of a heavy crane and, as a consequence, in weather conditions when the use of the crane would be too dangerous and/or the site is inaccessible to cranes and other lifting devices.

The invention also includes, for use with a wind energy convertor comprising an upstanding support having a central vertical axis and a substantially circular turbine which is directly or indirectly supported by an uppermost part of the support in such a way that the turbine is freely rotatable about said vertical axis and which comprises a plurality of circumferentially spaced blades extending lengthwise with respect to the support, an improved stator comprising an upper annular ring having an uppermost surface which over at least a part of its radial width is inclined downwardly towards the central axis of the stator, a lower annular ring co-axial with and axially spaced from the upper annular ring and, extending lengthwise between the annular rings, a plurality of circumferentially spaced blades which define, between adjacent blades, a plurality of venturi through which wind can be directed towards the central axis of the stator, which stator is adapted to be supported on the upstanding support of the wind energy convertor in such a way that the stator is co-axial with and surrounds the turbine with the upper annular ring adjacent and/or above the upper end of the turbine and the lower annular ring adjacent and/or below the lower end of the turbine.

The improved stator preferably has some or all of the optional features of the stator of the improved wind energy convertor hereinbefore described.

The invention is further illustrated by a description, by way of example, of two preferred forms of wind energy convertor with reference to the accompanying diagrammatic drawings, in which:

FIG. 3 is a fragmental side view, partly in section of a second preferred form of wind energy convertor having a support structure consisting of eight upstanding elongate members of which two only, for the sake of clarity, are shown, and FIG. 4 is a fragmental transverse cross-sectional view taken on the line IV—IV in FIG. 3.

Figure 1:
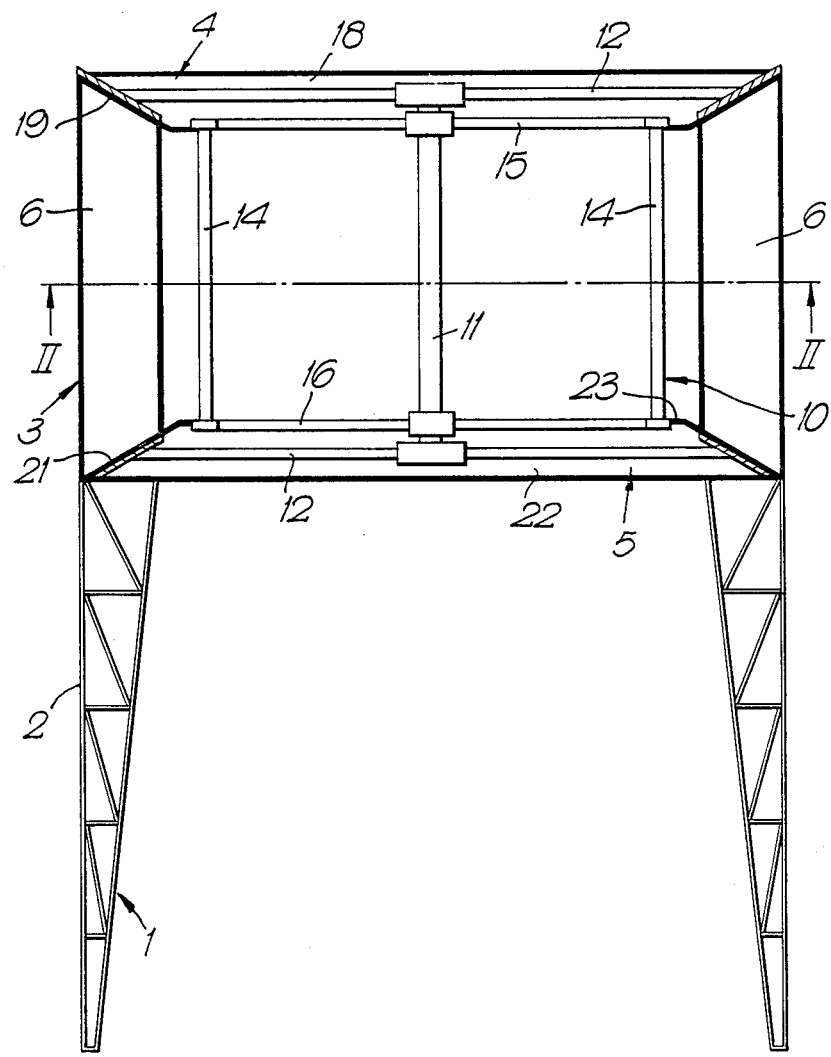
FIG. 1 is a fragmental side view, partly in section of a first preferred form of wind energy convertor having an upstanding support consisting of four upstanding elongate members of which two, for the sake of clarity, have been omitted.
Figure 2:
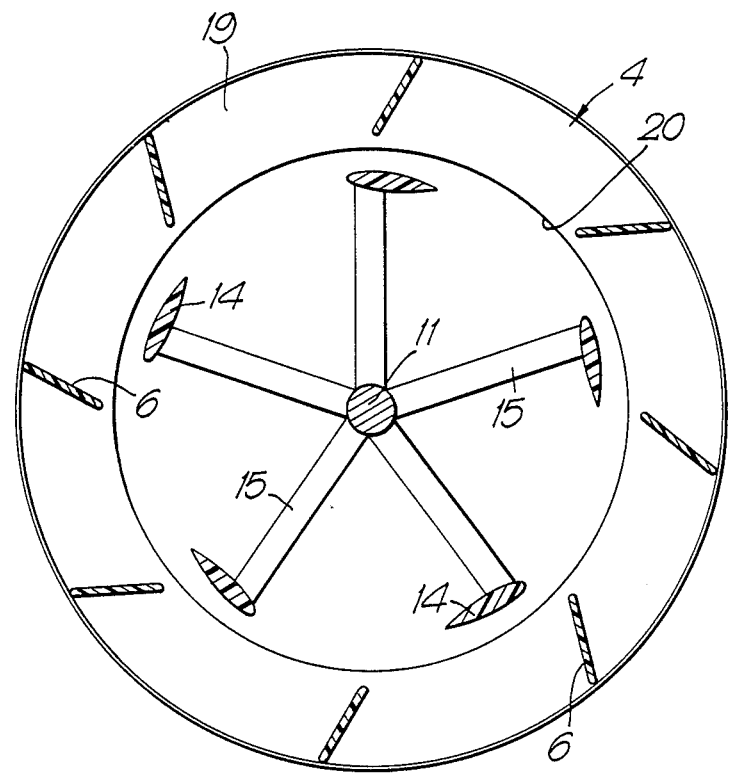
FIG. 2 is a fragmental transverse cross-sectional view taken on the line II—II in FIG. 1.

Referring to FIGS. 1 and 2, the first preferred form of wind energy convertor comprises an upstanding support 1 consisting of four circumferentially and uniformly spaced vertical fabricated members 2 which carry at their upper ends a stator 3 comprising an upper annular ring 4 and a lower annular body 5 interconnected by eight circumferentially spaced blades 6 which lie in vertical planes each at an angle of 30° to a radial plane passing through the central vertical axis of the convertor and which define a plurality of venturi. The stator 3 surrounds a circular turbine 10 which has a central shaft 11 and which is rotatably mounted at its upper and lower ends in bearings supported by diametrically extending rigid members 12 secured at their outer ends to the upper annular ring 4 and the lower annular ring 5 so that the turbine is freely rotatable about the central vertical axis of the convertor. The turbine 10 comprises five circumferentially spaced blades 15 which extend radially between the central shaft 11 and the vertical blades 14 and which, together, constitute a fan rigidly secured to the turbine. At the lower end of the turbine 10 are five circumferentially spaced blades 16 which extend radially between the central shaft 11 and the vertical blades 14 and which, together constitute a second fan rigidly secured to the turbine.

The upper annular ring 4 is in the form of an annular dish with planar upper and lower surfaces 18, 19, respectively, which, over substantially the whole of their radial widths, are inclined downwardly towards the central vertical axis of the convertor. The lower annular ring 5 is in the form of an inverted annular dish with planar upper and lower surfaces 21, 22, respectively, which, over the whole of their radial widths, are inclined upwardly towards the central vertical axis of the convertor. Both the upper and lower annular rings 4,5 are made of a single sheet of metal or metal alloy.

Each of the vertical turbine blades 14 has a transverse cross-sectional shape of substantially aerofoil form and is pivotably mounted about a vertical axis passing through the blade. A torsion bar (not shown) which extends along the vertical pivotal axis of each turbine blade 14 and which is fixed at each of its ends serves as a means of restraining the turbine blade against pivotal movement about its vertical pivotal axis.

Wind blowing against the turbine blades 14 will drive the turbine 10 rotatably about the central vertical axis in an anti-clockwise direction as viewed from above. Since the velocity of wind blowing over the upper planar surface 18 of the upper annular body 4 and against the lower planar surface 22 of the lower annular body 5 is caused to increase and become turbulent as it separates from the outer edges of the surfaces, a reduction in air pressure is created in the central circular openings 20 and 23 bounded, respectively, by the upper and lower annular rings 4 and 5 and consequently the velocity of wind flowing upwardly and downwardly through the turbine 10 and the circular openings 20 and 23 will increase and will drive the fans in an anti-clockwise direction. The increase in velocity of wind flowing upwardly and downwardly creates a reduction in air pressure in the space bounded by the turbine 10 with the result that the speed of the wind passing through the vertical turbine blades 14 is increased. The amount of wind energy available for conversion is further increased by the venturi defined by the blades 6 of the stator 3 because wind flowing through these openings is accelerated and directed on to the turbine blades 14 in such a way as to assist in driving the turbine in an anti-clockwise direction. The stator blades 6 defining the venturi shield from the wind the oncoming blades 14 of the turbine 10, thereby substantially reducing drag on the turbine and enabling the turbine to rotate at a higher linear velocity than that of the wind.

As the velocity of the turbine gradually increases, each of the blades 14 is caused to pivot about its vertical axis under the action of centrifugal forces in an anti-clockwise direction against the action of the restraining torsion bar (not shown) from an initial start position in which the major chord of the blade lies at an angle of $+15°$ to the tangent of the circle passing through the vertical pivotal axes of the blades to a normal running position in which the major chord of the blade lies at an angle of $+10°$ to said tangent, where the blade is restrained by the torsion bar. In the event of the velocity of the wind reaching or exceeding a maximum acceptable value, e.g. gale force, causing the turbine 10 to rotate at a speed above a desired predetermined value, the additional centrifugal force on each of the turbine blades 14 causes the blade to pivot further about its vertical axis against the action of its associated restraining torsion bar until the major chord of the turbine blade lies in a "feathering" position at an angle of $-10°$ to said tangent, up to which position aerodynamic spoiling will occur thus limiting any increase of speed above a predetermined maximum value irrespective of the velocity of the wind.

In one example of the first preferred form of wind energy convertor shown in FIGS. 1 and 2, the wind energy convertor has an overall height of 17 metres of which seven metres is the height of the stator. The turbine 10 has an overall height of approximately 5 metres. The stator 3 has an external diameter of 12.5 metres and the radially inner edges of the blades 6 of the stator lie on a circle having a diameter of 9.5 metres. The circular openings 20 and 23 bounded by the upper and lower annular rings 4 and 5 each have a diameter of 9 metres and the vertical axes of the pivotable turbine blades 14 lie on a circle having a diameter of 8 metres.

The second preferred form of wind energy convertor shown in FIGS. 3 and 4 is of substantially identical construction as the first preferred form of wind energy convertor shown in FIGS. 1 and 2 except that the blades of the stator lie in vertical planes extending radially from the central vertical axis of the convertor and except for the form of the turbine. For convenience, except for the turbine parts of the second preferred form of wind energy convertor have been given the same references as the corresponding parts of the first preferred form of wind energy convertor shown in FIGS. 1 and 2.

In the second preferred form of wind energy convertor, the turbine 30 comprises two groups 31, 32 of three circumferentially spaced blades extending lengthwise with respect to the convertor, the group 31 being mounted above and rigidly secured to the group 32, with the circumferentially spaced blades 33 of one group being circumferentially staggered with respect to the circumferentially spaced blades 34 of the other group. At the upper end of the upper group 31 are three circumferentially spaced blades 35 which extend radially between the central shaft 39 of the turbine and the vertical blades 33 and which, in effect, constitute a fan integral with the turbine. At the lower end of the group 32 are three circumferentially spaced blades 36 which extend radially between the central shaft 39 of the turbine and the vertical blades 34 and which, in effect constitute a second fan integral with the turbine.

Each of the turbine blades 33, 34 has a transverse cross-sectional shape of substantially aerofoil form and is pivotally mounted about the vertical axis passing through the blade. A torsion bar (not shown) which extends along the vertical pivotal axis of each turbine blade 33, 34 and which is fixed at each of its ends serves as a means of restraining the turbine blade against pivotal movement about its vertical pivotal axis.

The second preferred form of wind energy convertor operates in substantially the same way as the first preferred form of wind energy convertor, the circumferential staggering of the vertical blades 33, 34 of the two groups 31, 32 of blades of the turbine providing beneficial dynamic characteristics.

In one example of the second preferred form of wind energy convertor as illustrated in FIGS. 3 and 4, the wind energy convertor has an overall height of 61 metres of which the upper 31 metres is the height of the stator 3. The overall height of the turbine 30 is 21.5 metres. The stator 3 has an external diameter of 53.7 metres and the inner edges of the blades 6 of the stator lie on a circle having a diameter of 41 metres. The circular openings 20 and 23 of the upper and lower annular rings 4 and 5 each have a diameter of 38.6 metres and the turbine 30 has an overall diameter of 34.4 metres.

The mechanical energy into which the energy of a wind blowing in any direction can be successfully converted by the improved wind energy convertor of the present invention can be used in the generation of electricity by means of any convenient and known method and, in this case, the electrical generator and/or other ancillary equipment associated with the generation of electricity may be positioned at the foot of the convertor. Alternatively, the mechanical energy may be employed to produce power to split water into the gases hydrogen and oxygen.

We claim:

1. An improved wind energy convertor of the type having an upstanding support having a central vertical axis, a substantially circular turbine rotatably supported by the support whereby said turbine is freely rotatable about said vertical axis, said turbine having an upper end and a lower end and having a plurality of circumferentially spaced blades extending lengthwise with respect to the support and, coaxial with and surrounding a vertical axis of the turbine, a stator having an upper annular ring having a central opening therein, said upper ring positioned adjacent and above the upper end of the turbine, a lower annular ring having a central opening therein, said lower ring positioned adjacent and below the lower end of the turbine, and a plurality of circumferentially spaced venturi blades extending lengthwise between the annular rings which define, between adjacent blades, a plurality of venturi through which wind is directed on to the blades of the turbine, wherein the improvement comprises said upper annular ring having an upwardly facing top frusto-conical surface and a downwardly facing bottom frusto-conical surface, each of said top and bottom surfaces of the upper annular ring inclining downwardly towards the central vertical axis over substantially the entire width of the upper annular ring from an outer peripheral edge to an inner circumferential edge thereof whereby wind blowing across and over the top of the outer peripheral edge of the upper annular ring towards the central vertical axis is deflected over the downwardly inclined upwardly facing top frusto-conical surface of the upper annular ring to cause such turbulence in the wind that the air pressure in the central opening bounded by the upper annular body is decreased causing wind blowing through the venturi and against the blades of the turbine and driving the turbine rotatably about said central vertical axis to be drawn upwardly within the turbine and out of the upper annular ring through the central opening therein.

2. A wind energy convertor as claimed in claim 1, wherein said lower annular ring has a downwardly facing bottom frusto-conical surface and an upwardly facing top frusto-conical surface, each of said bottom and top surfaces of the lower annular ring inclining upwardly towards the central vertical axis over substantially the entire width of the lower annular ring from an outer peripheral edge to an inner circumferential edge thereof whereby wind blowing across and under the bottom of the outer peripheral edge of the lower annular ring towards the central vertical axis is deflected under the upwardly inclined lowermost surface of the lower annular ring to cause such turbulence in the wind that the air pressure in the circular opening bounded by the lower annular ring is decreased causing wind blowing through the venturi and against the blades of the turbine and driving the turbine rotatably about said central vertical axis to be drawn downwardly within the turbine and out of the lower annular ring through the central opening therein.

3. A wind energy converter as claimed in claim 1, wherein the surfaces of the blades of the stator are shaped to shield the on-coming blades of the turbine from the wind.

4. A wind energy converter as claimed in claim 1 wherein radially outer edges of the venturi blades are inclined radially inwardly in a direction towards the upper annular ring.

5. A wind energy convertor as claimed in claim 1, wherein, at least one of the upper and lower ends of the turbine, the turbine includes a plurality of circumferentially spaced, radially extending blades constituting a fan integral with the turbine.

6. A wind energy convertor as claimed in claim 1, wherein the substantially circular turbine has at least two groups of circumferentially spaced, lengthwise extending blades each of which groups of lengthwise extending blades is spaced lengthwise with respect to the other group of blades and is rigidly secured to the adjacent group of blades, the circumferentially spaced blades of one group being circumferentially staggered with respect to the circumferentially spaced blades of the other group.

7. A wind energy convertor as claimed in claim 1, wherein at least some of the plurality of circumferentially spaced, lengthwise extending blades of the turbine are pivotally mounted about a substantially vertical axis passing through the blade and each has associated means for automatically restraining pivotal movement of said blade about its vertical axis whereby said pivotally mounted blades automatically move to varying pivotal positions in response to changing wind conditions.

8. A wind energy convertor as claimed in claim 7, wherein the restraining means associated with each pivotal turbine blade of the group is a single restraining device which permits controlled pivotal movement of the blade until the centrifugal force on the blade at least reaches a predetermined value and which then resists further pivotal movement of the blade until the velocity of the wind at least reaches a maximum acceptable value at which value the restraining device permits further pivotal movement of the blade to a "feathering" position.

9. A wind energy convertor as claimed in any one of the preceding claims, wherein each turbine blade has a transverse cross-section of substantially aerofoil shape.

10. A wind energy convertor as claimed in claim 1, wherein the upstanding support comprises a plurality of upstanding elongate members uniformly spaced around said central vertical axis, the turbine being rotatably supported at at least one of its ends by said upstanding members.

11. A stator as claimed in claim 13, wherein a downwardly facing bottom frusto-conical surface and an upwardly facing top frusto-conical surface of the lower annular ring are inclined upwardly towards the central axis of the stator over substantially the whole of the radial width of said lower annular ring from an outer peripheral edge to an inner circumferential edge thereof.

12. A stator as claimed in claim 11, wherein the angle of inclination of each surface to the central axis of the stator is substantially constant throughout its radial width.

13. An improved stator of the type having a central axis, an upper annular ring having a central opening therein, said upper ring positioned about a central axis of the stator, a lower annular ring having a central opening therein, said lower ring positioned coaxial with and axially spaced from the upper annular ring and, extending lengthwise between the annular rings, a plurality of circumferentially spaced blades which define, between adjacent blades, a plurality of venturi, which stator is suitable for use in combination with a wind energy convertor having an upstanding support having a central vertical axis and a substantially circular turbine which is supported by the support and is freely rotatable about said vertical axis the improvement comprising said upper annular ring having an upwardly facing top frusto-conical surface and a downwardly facing bottom frusto-conical surface, each of said top and bottom surfaces of the upper annular ring inclining downwardly towards the central axis of the stator over substantially the entire radial width of the upper annular ring from an outer peripheral edge to an inner circumferential edge thereof.

* * * * *

UNITED STATES PATENT AND TRADEMARK OFFICE
CERTIFICATE OF CORRECTION

PATENT NO. : 4,857,753
DATED : August 15, 1989
INVENTOR(S) : Mewburn-Crook et al.

It is certified that error appears in the above-identified patent and that said Letters Patent is hereby corrected as shown below:

Column 2, line 32, change "body" to --ring--.

Column 2, line 67, change "body" to --ring--.

Column 3, line 54, change "of" to --on--.

Signed and Sealed this

Third Day of July, 1990

*Attest:*

HARRY F. MANBECK, JR.

*Attesting Officer*      *Commissioner of Patents and Trademarks*